United States Patent [19]
Ross et al.

[11] Patent Number: 5,271,509
[45] Date of Patent: Dec. 21, 1993

[54] STIRRUP ASSEMBLY FOR SECURING A CARGO HAVING UPPER AND LOWER PAIRS OF OPPOSED, BALL HEADED STUDS EXTENDING LATERALLY FROM EACH SIDE OF A CYLINDRICAL, SECURING STUD

[75] Inventors: James E. Ross; Bjarni Tryggvason, both of Gloucester, Canada

[73] Assignee: Canadian Space Agency/Agence Spatiale Canadienne, Montreal, Canada

[21] Appl. No.: 982,510

[22] Filed: Nov. 27, 1992

[51] Int. Cl.$^5$ ................................................ A47F 7/00
[52] U.S. Cl. .......................................... 211/13; 211/89
[58] Field of Search ............................ 211/89, 13, 192; 248/500, 503

[56] References Cited
U.S. PATENT DOCUMENTS 3,351,212 11/1967 McConnell ........................ 211/192
5,207,334 5/1993 Lear .................................. 211/89 X Primary Examiner—Robert W. Gibson, Jr.
Attorney, Agent, or Firm—Francis W. Lemon

[57] ABSTRACT

A stirrup assembly for securing a cargo having upper and lower pairs of opposed, ball headed studs, extending laterally from each side of a cylindrical, securing stud, has a side member for attachment of a cargo to, for example, the side wall of a cargo bay of a space shuttle. Two upper U-shaped stirrups are attached to an upper portion of the side member. The upper U-shaped of the stirrups have flared entries for receiving the ball heads of the upper studs and have fixed resilient seats, as well as a carriage spring like contact for the ball stud shaft. Two lower U-shaped stirrups are spaced across, and attached to, a lower portion of the side members. The U-shapes of the lower stirrups also have flared entries for receiving the ball heads of the lower studs. Each lower U-shaped stirrup has a spring loaded ball head retaining lever pivotally attached to that stirrup so as to be depressed by, and swung around, that ball head from the undepressed position. A split bearing is provided attached to the side member for downward urging of the cylindrical stud on the cargo so that the upper and lower ball heads are pushed into their stirrups and the levers are actuated. The cargo is buffered against vibrational loads and the ball heads are held against reverberating in the stirrups. The stirrups and balls accommodate thermal distortions of the cargo. The split bearing, when opened, releases the cylindrical stud and allows the cargo to move and distort from its nominal geometric shape. This relieves contact loads between the balls and stirrups which will allow a low friction force removal of the cargo from the stirrup assembly.

10 Claims, 4 Drawing Sheets

STIRRUP ASSEMBLY FOR SECURING A CARGO HAVING UPPER AND LOWER PAIRS OF OPPOSED, BALL HEADED STUDS EXTENDING LATERALLY FROM EACH SIDE OF A CYLINDRICAL, SECURING STUD This invention relates to a stirrup assembly for securing upper and lower pairs of opposed, ball headed studs extending laterally from each side of a cylindrical, securing stud.

BACKGROUND OF THE INVENTION

It has been found that it is necessary to mount a cargo payload in, for example, the cargo bay of a space shuttle in such a manner that the cargo is held substantially rigidly in the cargo bay, during launching and landing of the space shuttle. If the cargo in the cargo bay can dynamically couple or resonate with the structure of the space shuttle, the resulting dynamic loads may put the space shuttle off course, or produce structural damage to the cargo or the shuttle. The excitation forces come from, for example, the solid rocket boosters on launching, or the dynamic loads from the aerodynamics or contact with the ground on landing.

It has also been found that it is necessary to mount a cargo in, for example, the cargo bay of a space shuttle in such a manner that, once the space shuttle is in orbit around the Earth it is possible to gently release the cargo (e.g. a communications satellite) from the attachment in the cargo bay without using excessive force.

It goes without saying that such a cargo mounting would also be useful for transporting cargo by land, sea or air and for storage of such cargo on land or in space.

Yet another requirement that has been found is that the cargo must be mounted in such a manner as to be able to distort to accommodate thermal expansion of the structural materials due to the orbiting spacecraft cargo being subjected to temperature gradients.

There is a need for a cargo mounting which will hold the cargo substantially rigidly, which will allow the cargo to be released gently without use of excessive force, and which will allow the cargo to distort to accommodate thermal expansions due to temperature differentials across the cargo, and temperature differentials from the nominal design and manufacturing temperature, i.e. room temperature.

It has already been disclosed in, for example, U.S. Pat. No. 3,351,212, dated Nov. 7, 1967, "Pallet Rack Construction", K. McConnell, to provide one side of a pallet support beam with upper and lower, flattened hemispherical headed, studs for engaging keyhole slots in the uprights of a support frame forming a stirrup assembly for the studs. The heads of the studs are shaped as flattened hemispheres for guidance into the keyhole slots and to provide a flat underside support frame for the engaging surface. The keyhole slots in the uprights are to one side of the frame forming the stirrup assembly so that the studs will cantilever the pallet support beam from one side of the support frame.

While the support frame disclosed in the McConnell patent is useful it is not intended to, and is not capable of, securing the studs in such a manner that:

a) buffering the pallet support beam against vibrational loads is avoided, b) the beam is secured from reverberation of the studs in the keyhole slots, and c) any significant thermally induced distortions encountered will be accommodated.

SUMMARY OF THE INVENTION

According to the present invention there is provided a stirrup assembly for securing a cargo having opposed upper and lower ball headed studs, extending laterally from each side of a cylindrical securing stud, comprising a) a side member b) two upper U-shaped stirrups spaced apart across, and attached to, an upper portion of the side member, the U-shapes of the upper stirrups having flared entries for guiding the ball heads of the upper pair of ball headed studs into stirrup portions wherein they are rotatable but restrained against reverberation therein c) for each upper U-shaped stirrup,
  i) a resilient bearing seating for restraining the ball head laterally, and
  ii) a spring device, capable of maintaining contact with a cylindrical neck portion of the ball headed stud, and applying an upward force to urge the ball head upwardly relative to the stirrup, d) two lower U-shaped stirrups spaced apart across, and attached to, a lower portion of the side member, the lower U-shaped stirrups having flared entries for guiding the ball heads of the lower pair of ball headed studs into stirrup portions where they are rotatable about three right axes but restrained against reverberation therein, e) for each lower U-shaped stirrup,
  i) a ball head bearing lever pivotally attached to that stirrup so as to be capable of being depressed by, and swung around, the ball head of the stud received thereby and which is contoured to fit the form of the ball head,
  ii) spring loading means for supporting the ball head bearing lever in the undepressed position with the ball head therein, and which is capable of applying a force to urge the ball upwardly relative to the stirrup, and
  iii) a tilting pad screw assembly screw threaded into the stirrup opposite the ball head bearing lever, and f) cargo securing means for depressing the cylindrical stud on the cargo, thereby urging the cargo and ball heads into their respective stirrup positions and depressing the ball head bearing levers, so that the ball head bearing levers will be swung around their respective lower ball heads thereby forcing each lower ball head into contact with the tilting pad set screw assembly.

In this specification, "three right axes" means three axes which intersect at right angles.

Each resilient bearing seating pad may be a set screw, screw threaded in the associated upper stirrup, and a resilient seating pad, and the spring device may be a carriage spring like seating.

Each ball head bearing lever may be shaped as and inverted "T", one horizontal arm of the inverted "T" being pivotally mounted in a recess in the stirrup associated therewith, the other horizontal side arm and the vertical arm being shaped to closely fit the ball head to be retained therein, and the spring loading means for supporting that lever in the undepressed position may comprise a compression spring contained in a recess in that stirrup and urging the said other horizontal side arm upwardly.

Set screws with resilient pads attached thereto may be screw threaded into the upper pair of U-shaped stirrups for positioning the ball heads in a slidable manner and adjusting a clearance between the ball heads and the resilient pads.

There may be provided, for each lower U-shaped stirrup, a set screw, and a tilting pad attached to a leading end of the set screw in a universally rotatable manner, the tilting pad having a ball head contacting surface which closely conforms to the shape thereof, the set screw being threaded into the lower U-shaped stirrup so that the tilting pad may secure the ball head in a universally rotatable and slidable manner against the inverted, "T" shaped ball head bearing lever.

Each set screw and tilting pad may be capable of adjusting the force applied between the cargo securing means and the lower ball headed studs, by rotating the set screw to force the ball head to rotate the ball head bearing lever about its pivot while the cargo securing means is closed on the cylindrical stud; so that the distance between the lower ball headed stud and the cylindrical stud being substantially fixed between two points by the dimensions of the cargo, the force between these two points will rise in proportion to the stiffness of the cargo and the stirrup assembly between these two points.

The cargo securing means may comprise a split bearing, for engaging the cylindrical stud. When the cargo securing means is released, and the ball head bearing levers allowed to return to their undepressed position, clearances may be created between the vertical portion of the ball head bearing lever, the ball head, and the tilting pad set screw, which will substantially relieve frictional binding force and facilitate extraction from the stirrups and the cargo, stirrup assemblies and the side member will be free to distort either from differential thermal expansions, or from applied loads, which may introduce rotation or translation or out-of-plane motions between the ball heads, relative to the cargo and the stirrups.

A clearance may be provided between each resilient pad and the associated ball head to allow that ball head, when held within the stirrup, to be extracted with low residual friction forces and allow the ball head to rotate or slide within the stirrup and reduce residual friction forces when the ball is being removed.

The cargo securing means may be cylindrical stud engaging means for depressing the cylindrical stud in a rotatable manner and seat the ball heads in their respective stirrups.

BRIEF DESCRIPTION OF THE DRAWINGS

In the accompanying drawings which illustrate, by way of example, an embodiment of the present invention.

DESCRIPTION OF THE PREFERRED EMBODIMENT

In this specification upward or upwardly is the positive Z direction (FIG. 1) and downward or downwardly is the negative Z direction, horizontally forward is the negative X direction, horizontally aft is the positive X direction, inboard is the negative Y direction and outboard is the positive Y direction as shown on the attached figures. The positive directions are in the direction of the co-ordinate system arrows shown on the figures.

Figure 1:
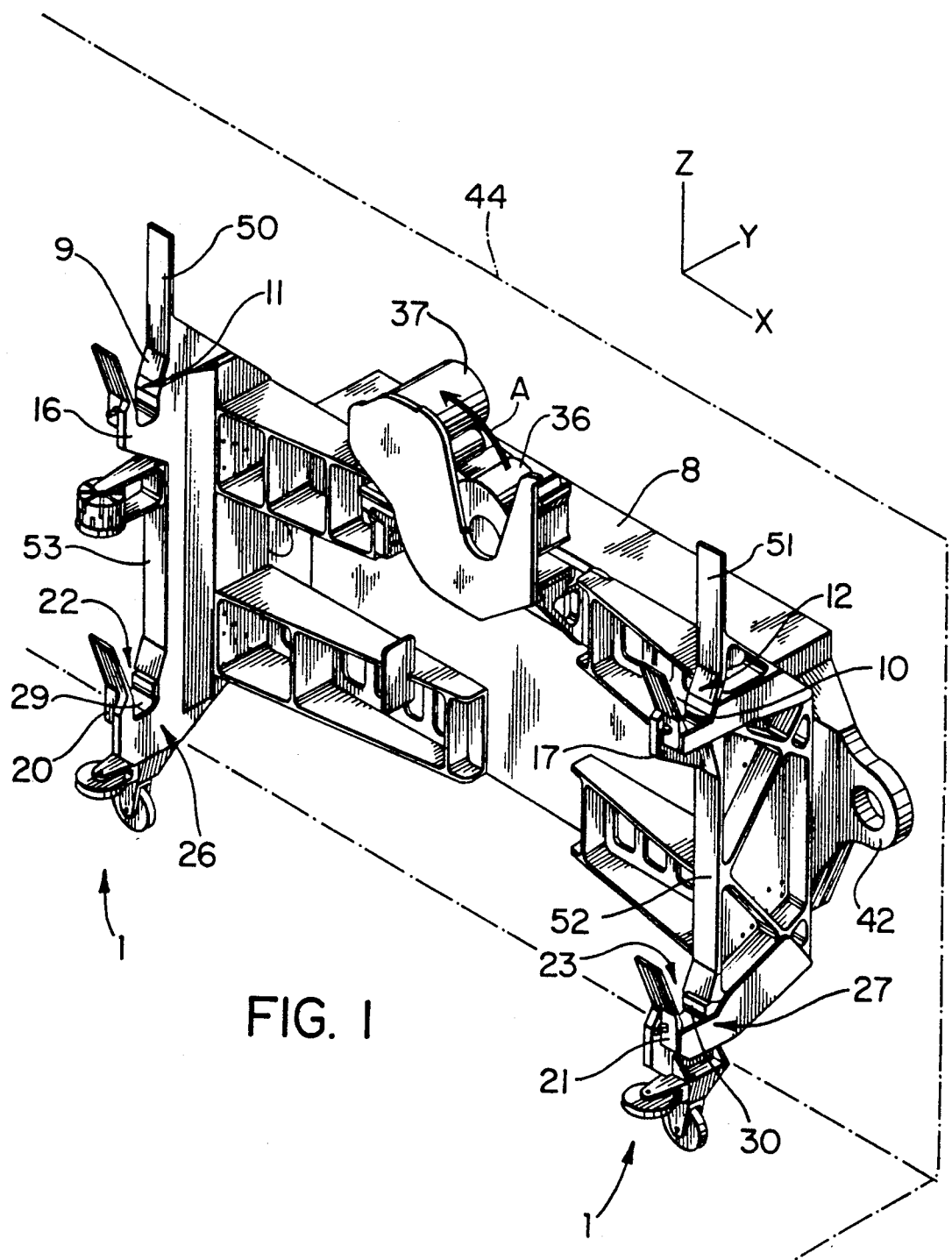
FIG. 1 is a corner view of a stirrup assembly, for securing a cargo, having a split spherical bearing forming a cargo securing means.
Figure 2:
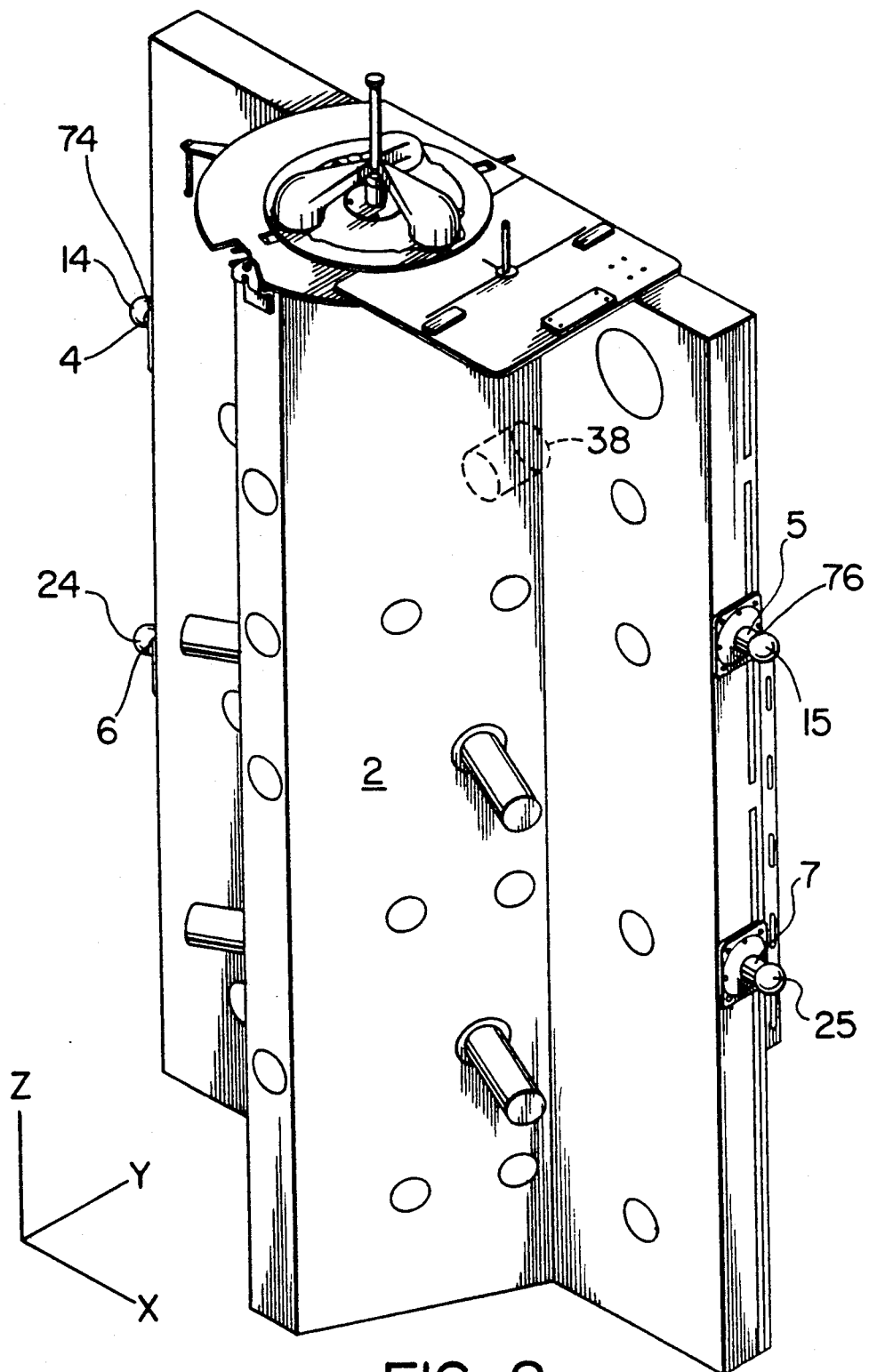
FIG. 2 is a corner view of a cargo having upper and lower pairs of ball studs, and cylindrical stud on the back face to be engaged with the cargo securing means.
Figure 3:
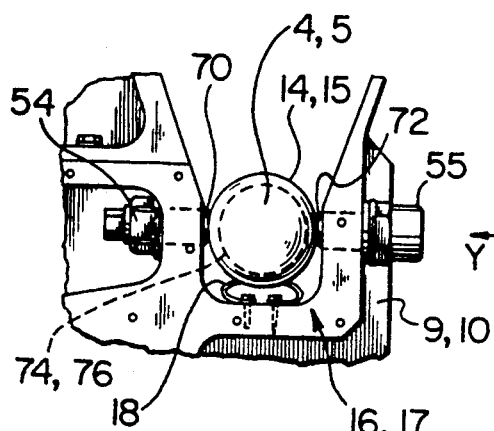
FIG. 3 is an enlarged, partially sectioned, scrap side view of one of the upper stirrups shown in FIG. 1, with the ball head in the position when the cargo securing means is closed.
Figure 4:
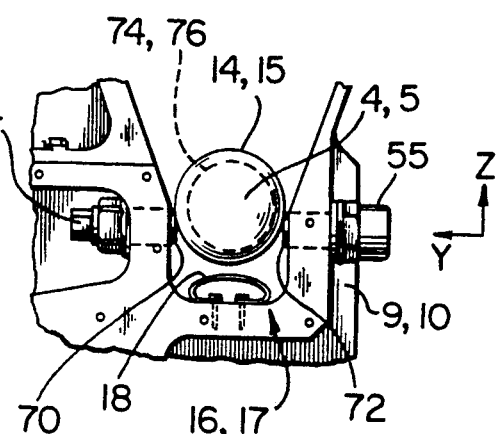
FIG. 4 is a similar view to FIG. 3, with the ball head in the position when the cargo securing means is in the open position.
Figure 5:
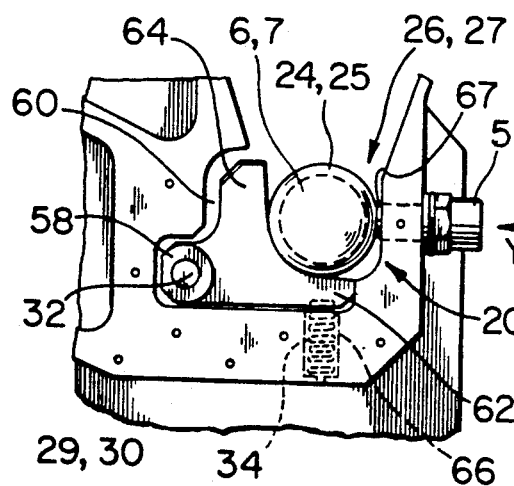
FIG. 5 is an enlarged, partially sectioned scrap view of one of the lower stirrups shown in FIG. 1, with the ball head in the position when the cargo securing means is closed.
Figure 6:
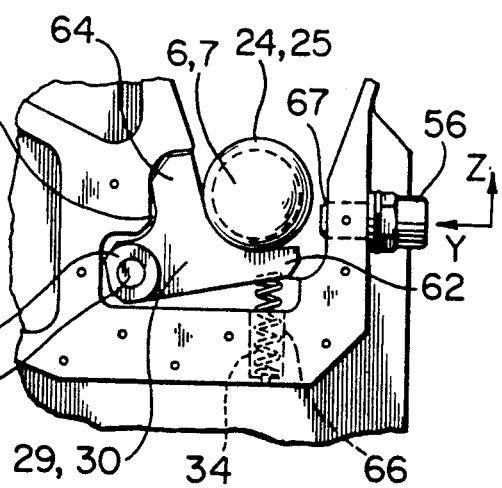
FIG. 6 is a similar view to FIG. 5, with the ball head in the position when the cargo securing means is open.
Figure 7:
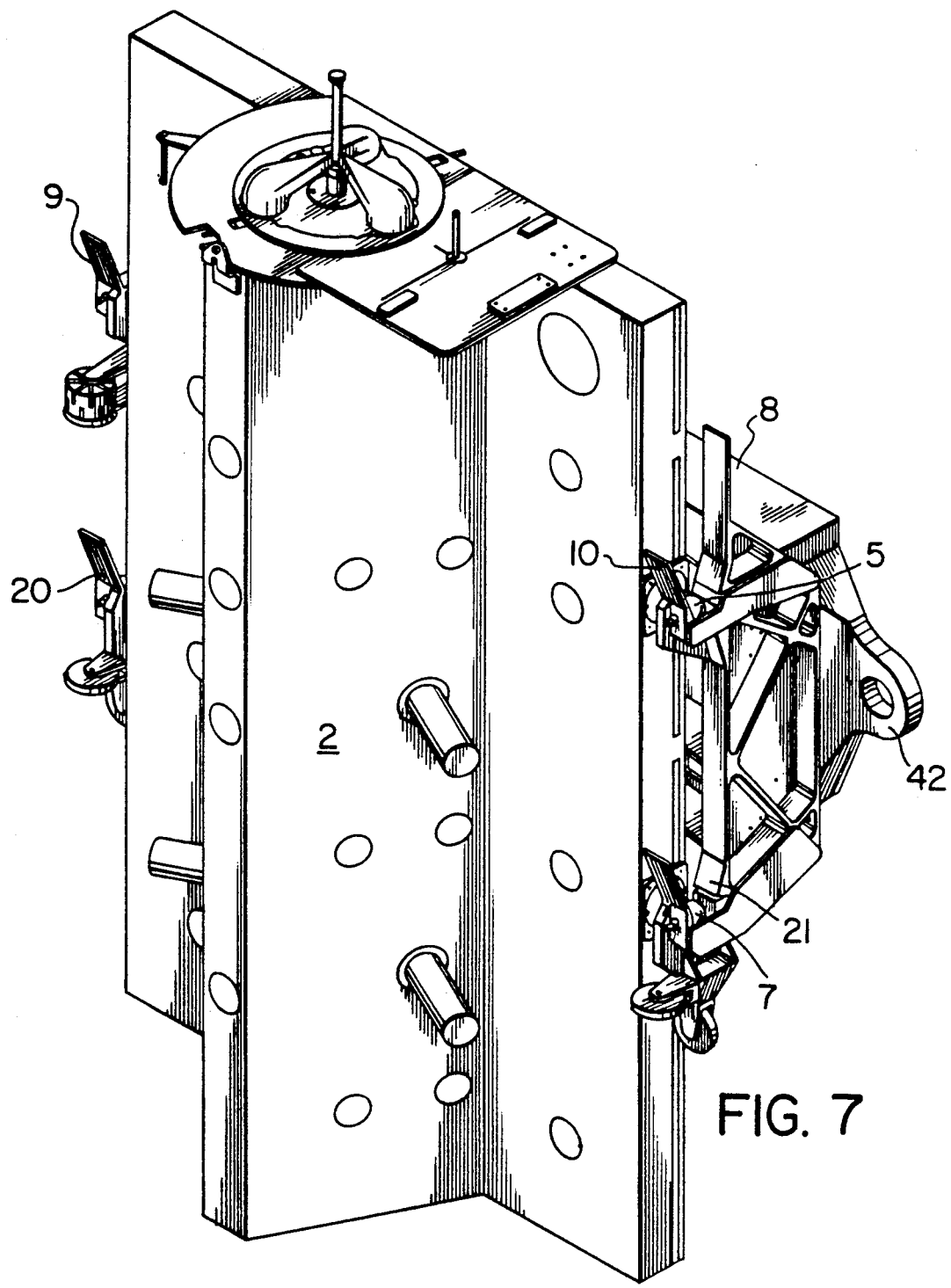
FIG. 7 is a corner view of the cargo shown in FIG. 2 having upper and lower pairs of ball studs, placed in the stirrup assembly shown in FIG. 1 with the cargo securing means closed.

Referring to FIGS. 1 to 7, there is shown a stirrup assembly, 1 (FIG. 1), for securing a cargo, 2 (FIG. 2) having upper and lower pairs, 4, 5, and 6, 7 respectively, of opposed, ball headed studs extending laterally from each side of a cylindrical, securing stud 38, comprising, a) a side member 8 (FIG. 1)

b) two upper U-shaped stirrups 9 and 10 spaced apart across, and attached to, an upper portion of the side member 8, the U-shapes of the upper stirrups having flared entry portions 11 and 12 for guiding the ball heads 14 and 15 (FIG. 2) of the upper pair of ball headed studs 4 and 5 into stirrup lower portions 16 and 17 (FIGS. 3 and 4) wherein they are rotatable, and translatable in one horizontal direction (+/−X direction), but restrained against reverberation therein, c) for each upper U-shaped stirrup 9, 10, i) a resilient bearing seating in the form of set screws 54 and 55 (FIGS. 3 and 4) having resilient material 70 and 72 respectively for restraining the ball head 14, and 15 laterally (X/−Y direction), and ii) a spring device, in the form of a carriage like spring 18, capable of maintaining contact with cylindrical neck portions 74 and 76, of the ball headed studs 4 and 5 respectively, and applying an upward force to urge the ball head 14 and 15, upwardly (Z direction) relative to the stirrup 9 and 10, d) two lower U-shaped stirrups 20 and 21 (FIG. 1) spaced apart across, and attached to, a lower portion of the side member 8, the lower U-shaped stirrups 20 and 21 having flared entry portions 22 and 23 for guiding the ball heads 24 and 25 (FIG. 2) of the lower pair of ball headed studs 6 and 7 into stirrup lower portions 26 and 27 where they are rotatable about three right axes (i.e. rotatable about all three axes, X, Y and Z) but restrained against reverberation therein, e) for each lower U-shaped stirrup 20 and 21, i) a ball head bearing lever 29, 30 (FIG. 1) pivotally attached, by a pivot such as that shown and designated 32 (FIGS. 5 and 6) to that stirrup 20, 21 so as to be capable of being depressed by, and swung around, the ball head 24, 25 (FIG. 2) of the stud 6, 7 received thereby, and which is contoured to fit the form of the ball head 24, 25, ii) spring loading means, such as compression spring 34 (FIGS. 5 and 6) to for supporting the ball head bearing lever 29, 30 in the undepressed position (FIG. 6) with the ball head 24, 25 therein, and which is capable of applying a force to urge the ball head 24, 25 upwardly relative to the stirrup 20, 21, and iii) a tilting pad set screw assembly, in the form of set screw 56, screw threaded in the stirrup 20,21 opposite the ball head bearing lever 29, 30, and f) cargo securing means, in the form of a split cylindrical bearing 36 (FIG. 1) which may be opened in the direction of arrow A, by the motorized actuator, 37, for depressing the cargo 2 (FIG. 2) by engaging the cylindrical stud, 38 extending from the rear side of the cargo 2, thereby urging the ball heads 14, 15, 24, and 25 into their respective stirrup portions 16, 17, 26 and 27 and depressing the ball head bearing levers 29 and 30 (FIGS. 5 and 6, so that the ball head bearing levers 29 and 30 will be swung around their respective lower ball heads 24, and 25 thereby forcing each lower ball head 24, 25 into contact with its tilting pad set screw assembly 56.

The side member 8 (FIG. 1) has two mounting lugs, one of which is shown and designated 42, for mounting the side member in the cargo bay, 44 of a space shuttle.

The stirrups 9, 20 and 10,21, form part of end fitting assemblies, 1 (FIG. 1) which have runners 50 to 53 for guiding the ball heads 14, 15, 24, and 25 (FIG. 2) into their respective stirrups 9, 10, 20, and 21 (FIG. 1).

As previously stated, the upper U-shaped stirrups, 9 and 10 (FIG. 1) have resilient material 70 and 72 on the end of the set screws 54 and 55 (FIG. 3) which are screw threaded into the stirrups, 9 and 10 for centering or accommodating the position of the ball heads, 11 and 12 in a slidable manner and for allowing the assembly to be used with ball heads of different diameters.

The lower pair of U-shaped stirrups 20 and 21 (FIGS. 5 and 6) have the set screw 56 (FIGS. 5 and 6) screw threaded into the stirrup portions 26 or 27 for securing the ball heads 24 and 25 in a rotatable manner against the ball head bearing levers 29 and 30 (FIGS. 5 and 6).

As will be seen from FIGS. 1 and 5, each ball head bearing lever 29 or 30 (FIGS. 5 and 6) is shaped as an inverted "T". One horizontal side arm, 58 of the inverted "T" is pivotally mounted in a recess, 60 (FIGS. 5 and 6) in the stirrup 20 or 21 (FIGS. 5 and 6), and the other horizontal side arm, 62 and the vertical arm, 64 are shaped to closely fit the ball head, 24 or 25 (FIG. 2) to be retained therein. The compression spring, 34 is contained in a recess, 66 in the bearing lever 29 or 30 to urge the horizontal side arm upwardly, which, strictly speaking is a rotary motion about the pivot 32.

The split cylindrical bearing, 36 and its actuator, 37 is a Light Weight Longeron Latch (LWLL) assembly (Part no. V073-544100) supplied by Rockwell International Corporation, Space Transportation Systems Division, 12214 Lakewood Blvd., Downey, Calif. USA.

In operation, with the split cylindrical bearing, 36 open, the stirrup assembly is mounted as shown in FIG. 1 by the lugs, 42 in the cargo bay, 44 of a space shuttle. The ball heads 11, 12, 24, and 25 of the cargo 2 (FIG. 2) are then lowered into the U-shaped stirrups 9, 10, 20, and 21 by sliding against the runners 50 to 53. This is continued until the lower ball heads 24 and 25 are resting on the ball head bearing levers, 29 and 30, which are in the undepressed position, if the cargo is in a weightless state, or partially or fully depressed if on Earth, depending of the cargo's weight.

The upper half of the split cylindrical bearing 36 is then closed over the cylindrical stud, 38 to depress the cylindrical stud 38 in a rotatable manner and push the entire cargo, 2 downwardly (negative Z direction) so that the carriage spring like devices, 18 are depressed, thereby assuring contact, and the ball head bearing levers are actuated to secure the ball heads 24 and 25 against the tilting pad 67 of the set screw, 56.

Secured in this manner, the ball heads 11, 12, 24 and 25 (FIGS. 3, 4, 5, and 6) are rotatable so that the side member of the cargo is free to distort due to differential thermal expansions and contractions encountered by the surrounding transporter structure or the cargo's structure. At the same time, the cargo, 2 is securely mounted in the stirrups, 9, 10, 20 and 21 so that the combined structure behaves as an integrated unit, which raises its natural frequency to the point where it will not resonate with the transporter structure. Thereby it avoids the generation of high dynamic loads which could have a detrimental effect on the stability of the transporter. When the split spherical bearing is released, the residual frictional loads are relieved by motion of the bearing levers 29 and 30, and balls 14,15, 24, and 25 to effect a low force extraction.

Preferably the ball head contacting surfaces of the ball head bearing levers 29 and 30, and the tilting pad 67 are coated with a self lubricating bearing material.

We claim:

1. A stirrup assembly for securing a cargo having upper and lower pairs of opposed, ball headed studs extending laterally from each side of a cylindrical, securing stud, comprising, a) a side member, b) two upper U-shaped stirrups spaced apart across, and attached to an upper portion of the side member, the U-shapes of the upper stirrups having flared entries for guiding the ball heads of the upper pair of ball headed studs into stirrup portions wherein they are rotatable but restrained against reverberation therein, c) for each upper U-shaped stirrup,
i) a resilient bearing seating for restraining the ball head laterally, and
ii) a spring device capable of maintaining contact with a cylindrical neck portion of the ball headed stud head and of applying an upward force to urge the ball head upwardly relative to the stirrup, d) two lower U-shaped stirrups spaced apart across, and attached to, a lower portion of the side member, the lower U-shaped stirrups having flared entries for guiding the ball heads of the lower pair of ball headed studs into stirrup portions where they are rotatable about three right axes but restrained against linear reverberation therein, e) for each lower U-shaped stirrup,
i) a ball head bearing lever pivotally attached to that stirrup so as to be capable of being depressed by, and swung around, the ball head of the stud received thereby and which is contoured to fit the form of the ball head,
ii) spring loading means for supporting the ball head bearing lever in the undepressed position with the ball head therein, and which is capable of applying a force to urge the ball head upwardly relative to the stirrup, and
iii) a tilting pad set screw assembly screw threaded into the stirrup opposite the ball head bearing lever, and f) cargo securing means for depressing the cylindrical stud on the cargo thereby urging the ball heads into their respective stirrup positions and depressing the ball head bearing levers, so that the ball head bearing levers will be swung around their respective lower ball heads thereby forcing each lower ball into contact with its tilting pad set screw assembly.

2. An assembly as claimed in claim 1, wherein each resilient bearing seating is a set screw, screw threaded in the associated upper stirrup, and a resilient pad attached to the end of the set screw, and the spring device is a carriage spring like seating.

3. An assembly as claimed in claim 1, wherein each ball head bearing lever is shaped as an inverted "T", one horizontal side arm of the inverted "T" is pivotally mounted in a recess in the stirrup associated therewith, and the other horizontal side arm and the vertical arm are shaped to closely fit the ball head to be retained therein, and the spring loading means for supporting that lever in the undepressed position comprises a compression spring contained in recesses in the stirrup and lever portions and urges the said other horizontal side arm upwardly.

4. An assembly as claimed in claim 2, further comprising set screws threaded in the upper pair of U-shaped stirrups for positioning the ball heads in a slidable manner and adjusting a clearance between the ball heads and the resilient pads.

5. An assembly as claimed in claim 4, further comprising, for each lower U-shaped stirrup, a set screw, and a tilting pad attached to a leading end of the set screw in a universally rotatable manner, the tilting pad having a ball head contacting surface which closely conforms to the shape thereof, the set screw being threaded into the lower U-shaped stirrup so that the tilting pad may secure the ball head in a universally rotatable and slidable manner against the inverted, "T" shaped ball head bearing lever.

6. An assembly as claimed in claim 5, wherein each set screw and tilting pad is capable of adjusting the force applied between the cargo securing means and the lower ball headed studs by rotating the set screw to force the ball head to rotate the ball head bearing lever about its pivot while the cargo securing means is closed on the cylindrical stud; so that with the distance between the lower ball headed stud and the cylindrical stud being substantially fixed between two points by the dimensions of the cargo, the force between these two points will rise in proportion to the stiffness of the cargo and the stirrup assembly between these two points.

7. An assembly as claimed in claim 1, wherein the cargo securing means comprises a split cylindrical bearing, for engaging the cylindrical stud.

8. An assembly as claimed in claim 3, wherein, when the cargo securing means is released, and the ball head bearing levers allowed to return to their undepressed position, clearances are created between the vertical arm of the ball head bearing lever, the ball head, and the tilting pad set screw, which will substantially relieve frictional binding force and facilitate cargo extraction from the stirrups, and the cargo, stirrup assemblies and the side member will be free to distort either from differential expansions, or from applied loads, which may introduce rotation or translation of out-of-plane motions between the ball heads, relative to the cargo and the stirrups.

9. An assembly according to claim 2, wherein a clearance is provided between each resilient pad and the associated ball head to allow that ball head, when held within the stirrup, to be extracted with low residual friction forces and allow the ball head to rotate or slide within the stirrup and reduce residual friction forces when the ball is being removed.

10. An assembly according to claim 1, wherein the cargo securing means is a cylindrical stud engaging means for depressing the cylindrical stud in a rotatable manner and seat the ball heads in their respective stirrups.

* * * * *